United States Patent [19]

Georget

[11] Patent Number: 4,727,763
[45] Date of Patent: Mar. 1, 1988

[54] MECHANISM FOR TRANSFORMING A RECIPROCATING RECTILINEAR MOTION INTO AN INTERMITTENT ROTARY MOTION

[75] Inventor: Jean-Pierre Georget, Douchy Les Mines, France

[73] Assignee: Fives-Cail Babcock, Paris, France

[21] Appl. No.: 50,049

[22] Filed: May 13, 1987

[30] Foreign Application Priority Data

May 27, 1986 [FR] France ................... 86 07541

[51] Int. Cl.$^4$ ................... F16H 27/02; F16H 31/00
[52] U.S. Cl. ................... 74/129; 74/88; 74/161
[58] Field of Search ........... 74/88, 128, 129, 160, 74/161

[56] References Cited

U.S. PATENT DOCUMENTS

| | | | |
|---|---|---|---|
| 2,346,352 | 4/1944 | Boxell | 74/128 |
| 2,547,533 | 4/1951 | Mills | 74/129 |
| 2,780,372 | 2/1957 | Covitt et al. | 74/88 |
| 3,154,147 | 10/1964 | Lanmon | 74/160 |
| 3,587,333 | 6/1971 | Duncan | 74/88 |
| 3,762,228 | 10/1973 | Crepin | 74/88 |
| 4,519,263 | 5/1985 | Milberger | 74/128 |

FOREIGN PATENT DOCUMENTS

| | | | |
|---|---|---|---|
| 866776 | 2/1953 | Fed. Rep. of Germany | 74/160 |
| 380938 | 6/1940 | Italy | 74/129 |
| 724849 | 3/1980 | U.S.S.R. | 74/128 |

*Primary Examiner*—Lawrence Staab
*Attorney, Agent, or Firm*—Kurt Kelman

[57] ABSTRACT

A mechanism for transforming a reciprocating rectilinear motion into an intermittent rotary motion comprises a first element having a longitudinal axis and being reciprocable in a direction parallel to said axis, and a second element coaxially surrounding the first element and being rotatable about the axis. The first element carries a set of two cams circumferentially and axially spaced from each other, each cam having, in plan view, the shape of a rectangular part having two opposite sides extending parallel to the axis and a triangular part having a base adjoining the rectangular part, the triangular part projecting from the rectangular part in the direction of the axis, and the triangular parts of the cams pointing in opposite directions. The second element carries a set of three pins having radially extending axes disposed in a plane extending perpendicularly to the longitudinal axis, the pins being circumferentially spaced from each other and projecting towards the cams for cooperation therewith to transform the reciprocating rectilinear motion of the first element into an intermittent rotary motion of the second element, the cams having a width and disposition and the pins having a circumferential spacing such that two adjacent ones of the pins simultaneously engage the opposite sides of the rectangular part of one cam and the third pin faces the point of the other cam. A cam follower needle is associated with each cam and resiliently engages a side of the triangular cam part close to the base thereof.

3 Claims, 10 Drawing Figures

MECHANISM FOR TRANSFORMING A RECIPROCATING RECTILINEAR MOTION INTO AN INTERMITTENT ROTARY MOTION

The present invention relates to a mechanism for transforming a reciprocating rectilinear motion into an intermittent rotary motion, which comprises a first element having a longitudinal axis and being reciprocable in a direction parallel to the axis, the first element carrying a set of cams, and a second element coaxially surrounding the first element and being rotatable about the axis, the second element carrying a set of abutments, such as pins or rollers, having radially extending axes and cooperating with the cams to transform the reciprocating rectilinear motion of the first element into an intermittent rotary motion of the second element.

French patent No. 83 0139, published Aug. 3, 1984, discloses a mechanism of this type, which comprises two annular saw-tooth cams, the number of saw teeth being equal to half the number of steps necessary for effectuating a complete rotation of the second element, the two abutments cooperating therewith being angularly offset by one step. To avoid an uncontrolled rotation of the second element, springs are used in this mechanism for constantly maintaining contact between the cams and the abutments. More particularly, when the first rectilinearly reciprocating element is in one or the other of its end positions, one of the abutments is resiliently held at the bottom of the saw teeth of the associated cam to block the rotation of the second element. The effectiveness of this locking action depends on the biasing force of the spring. If this is strong, which is desirable for reasons of safety, a drive of substantial power must be used for the reciprocation of the first element. Such a drive is expensive and may be cumbersome, which constitutes a serious disadvantage if the mechanism is disposed in a limited space, for example in a hollow shaft.

It is the primary object of this invention to provide a mechanism for transforming a reciprocating rectilinear motion into an intermittent rotary motion, wherein the two elements are constantly positively coupled to each other, particularly when the first element is in a respective end position, while requiring only a relatively small driving power.

The above and other objects are accomplished according to the invention with such a mechanism wherein the first element carries a set of two cams circumferentially and axially spaced from each other, each cam having, in plan view, the shape of a rectangular part having two opposite sides extending parallel to the axis and a triangular part having a base adjoining the rectangular part, the triangular part projecting from the rectangular part in the direction of the axis, and the triangular parts of the cams pointing in opposite directions, and the second element carries a set of three pins having radially extending axes disposed in a plane extending perpendicularly to the longitudinal axis, the pins being circumferentially spaced from each other and projecting towards the cams for cooperation therewith to transform the reciprocating rectilinear motion of the first element into an intermittent rotary motion of the second element, the cams having a width and disposition and the pins having a circumferential spacing such that two adjacent ones of the pins simultaneously engage the opposite sides of the rectangular part of one cam and the third pin faces the point of the other cam.

A cam follower needle is associated with each cam, the needle resiliently engaging a side of the triangular cam part close to the base thereof to displace a respective one of the pins from the triangular cam part side when the pin glides along the rectangular cam part and reaches the triangular cam part base, and the needle being resiliently displaceable from the triangular cam part side to permit the passage of the pin gliding therealong from the point to the base of the triangular cam part.

The cams and/or the pins (or equivalent abutments) are regularly distributed over the periphery of the first element to permit intermittent rotation of the second element over 360°. At each displacement of the first element in one or the other direction, the second element turns an angle equal to half the angular spacing between the axes of two adjacent abutment pins.

The above and other objects, advantages and features of the present invention will become more apparent from the following detailed description of certain now preferred embodiments thereof, taken in conjunction with the accompanying, partly schematic drawing wherein FIG. 1 is a side elevational view, partly in axial section, of a mechanism according to this invention;

Figure 1:
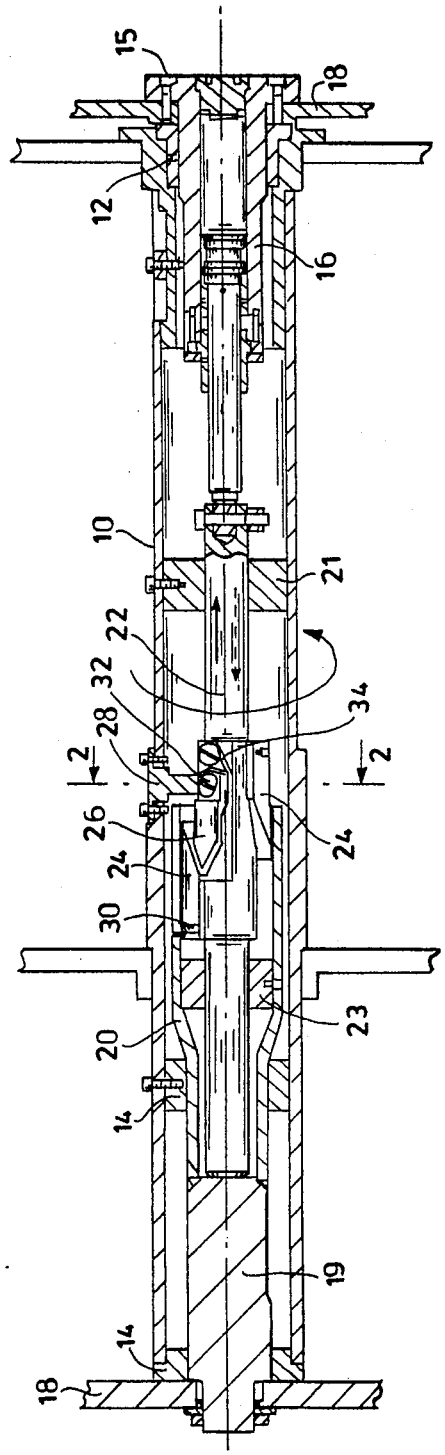
Figure 2:
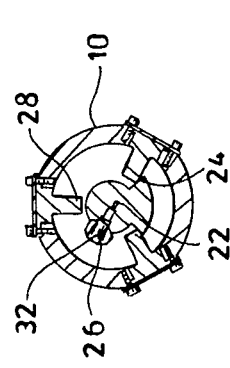
FIG. 2 is a transverse section along line 2—2 of FIG. 1.

Referring now to the drawing and first to FIGS. 1 and 2, the illustrated mechanism comprises first element 22 constituted by a shaft having a longitudinal axis and being reciprocable in a direction parallel to the axis, as indicated by the two arrows shown in full and broken lines, respectively. Second element 10 constituted by a tubular shaft coaxially surrounds first element 22 and is rotatable about the longitudinal axis, as indicated by an arcuated arrow. The ends of tubular shaft 10 are supported on bearings 12 and 14. Bearing 12 is mounted on tubular stub shaft 16 affixed by bolts 15 to frame 18. The tubular stub shaft constitutes the body of a jack whose reciprocatory motion controls the rotation of tubular shaft 10 through the mechanism of the present invention. Bearings 14 supporting the opposite end of the tubular shaft are respectively mounted on second tubular stub shaft 20 and solid end piece 19 to which tubular stub shaft 20 is affixed, for example by welding, and which, in turn, is affixed to frame 18.

Reciprocable shaft 22 carries a set of two cams 24 circumferentially and axially spaced from each other and respective cam follower needle 26 associated with each cam. The cams are diametrically opposed to each other. Rotatable tubular shaft 10 carries a set of three abutment pins 28 affixed to the tubular shaft and having radially extending axes disposed in a plane extending perpendicularly to the longitudinal axis. As best shown in FIG. 2, pins 28 are circumferentially spaced from each other and project inwardly from the tubular shaft towards the cams for cooperation therewith to transform the reciprocating rectilinear motion of shaft 22 into an intermittent rotary motion of tubular shaft 10.

Shaft 22 is coupled to the piston rod of the jack reciprocated in jack body 16 and is supported in bearings 21 and 23 permitting longitudinal displacement of shaft 22 by the jack. Lug 30 affixed to shaft 22 engages a longitudinal groove in tubular stub shaft 20 to hold shaft 22 against rotation during its reciprocation.

As best shown in the developed views, each cam has, in plan view, the shape of a rectangular part having two opposite sides extending parallel to the longitudinal axis and a triangular part having a base adjoining the rectangular part, the triangular part projecting from the rectangular part in the direction of the axis. The triangular parts of the cams point in opposite directions.

A respective cam follower needle 26 is associated with each cam 24 and resiliently engages a side of the triangular cam part close to the base thereof. A bolt 32 constituting a radially extending pivot axis supports each cam follower needle on shaft 22, the pivot axis being disposed remote from the rectangular cam part with respect to the point of the triangular cam part and needle 26 having a point disposed approximately at the level of the triangular cam part base. Leaf spring 34 biases cam follower needle 26 against associated cam 24.

As shown in FIG. 2, pins 28 are circumferentially spaced from each other by 120°. Their length is such that the ends thereof may make contact with the sides of cams 24 and with needles 26.

FIGS. 3 to 8 show the relative positions of abutment pins 28, designated 1, 2 and 3, and cams 24a, 26b and their associated cam follower needles 26a, 26b during one complete rotation (360°) of tubular shaft 10 in six steps, each figure corresponding to one step, i.e. a 60° rotation caused by the rectilinear displacement of shaft 22 by a full stroke of the piston rod in alternatingly opposite directions. The different positions of the pins at the end of each piston rod stroke have been indicated by subscripts 0 to 5 for each pin 1, 2 and 3.

As will be apparent from the following description, cams 24a, 24b have a width and disposition and pins 28 have a circumferential spacing such that two adjacent pins simultaneously engage the opposite sides of the rectangular part of one cam and the third pin faces the point of the other cam. Each needle 26a, 26b resiliently engages a side of the triangular cam part close to the base thereof to displace a respective pin 28 from the triangular cam part side when the pin glides along the rectangular cam part and reaches the triangular cam part base, and the needle is resiliently displaceable from the triangular cam part side to permit passage of the pin gliding therealong from the point to the base of the triangular cam part.

Figure 3:
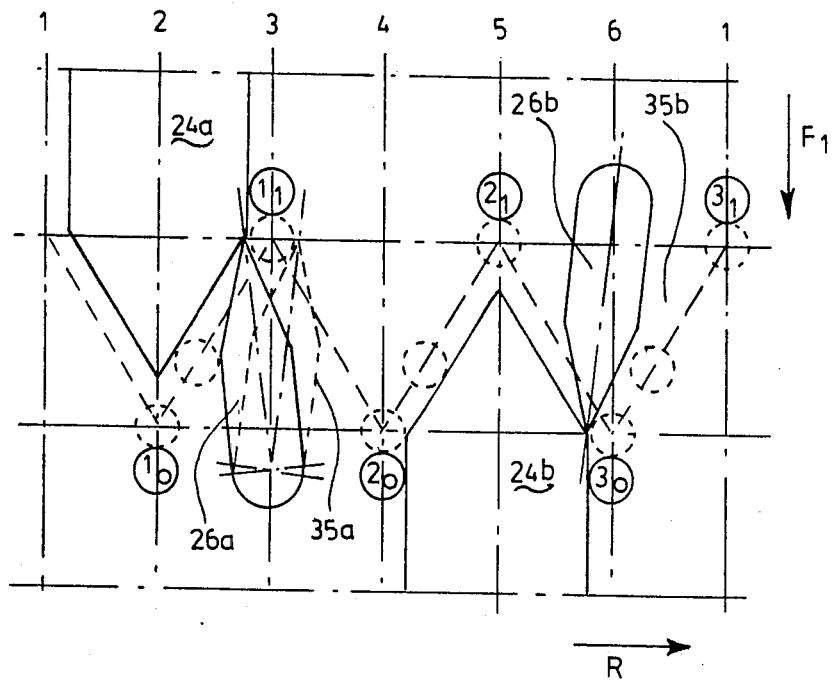
FIGS. 3 to 8 are diagrammatic developed views showing the different relative positions of the cams and abutment pins of the mechanism of FIG. 1 during a complete rotation of the second element.
Figure 4:
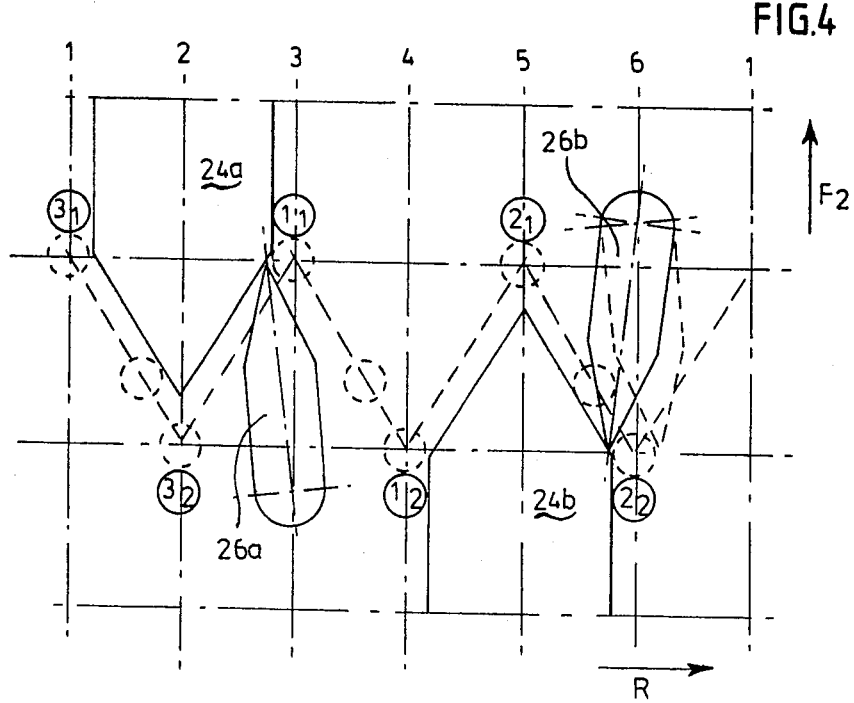
Figure 5:
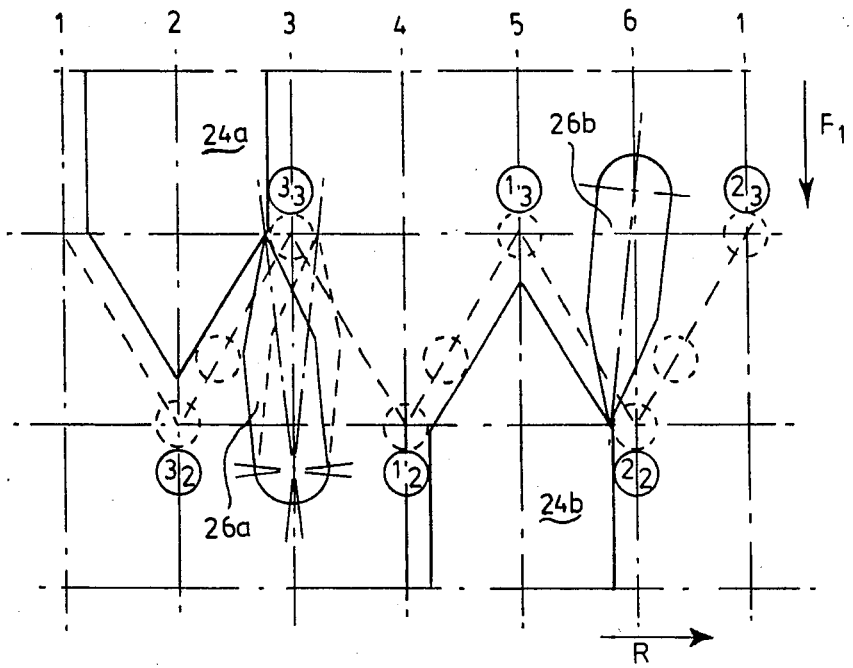
Figure 6:
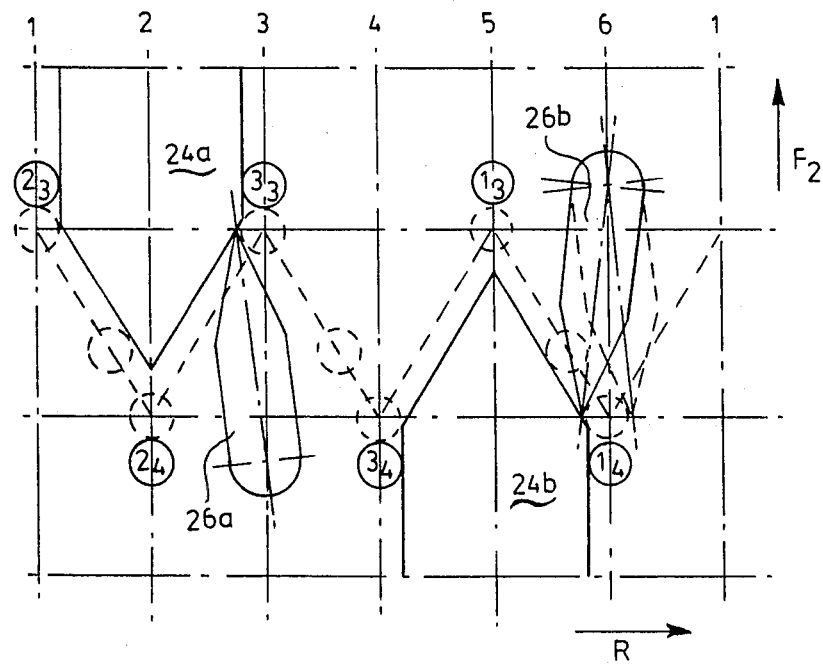
Figure 7:
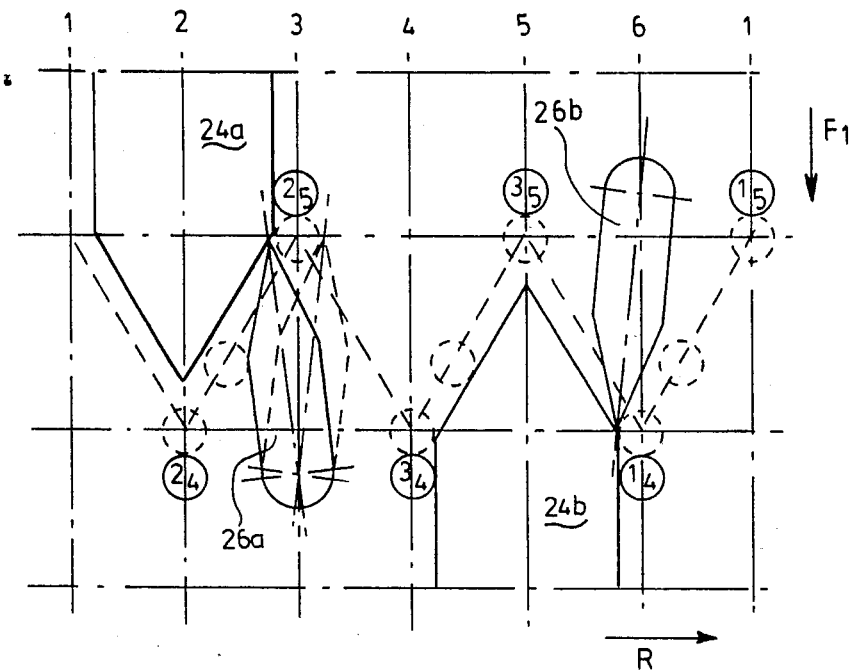
Figure 8:
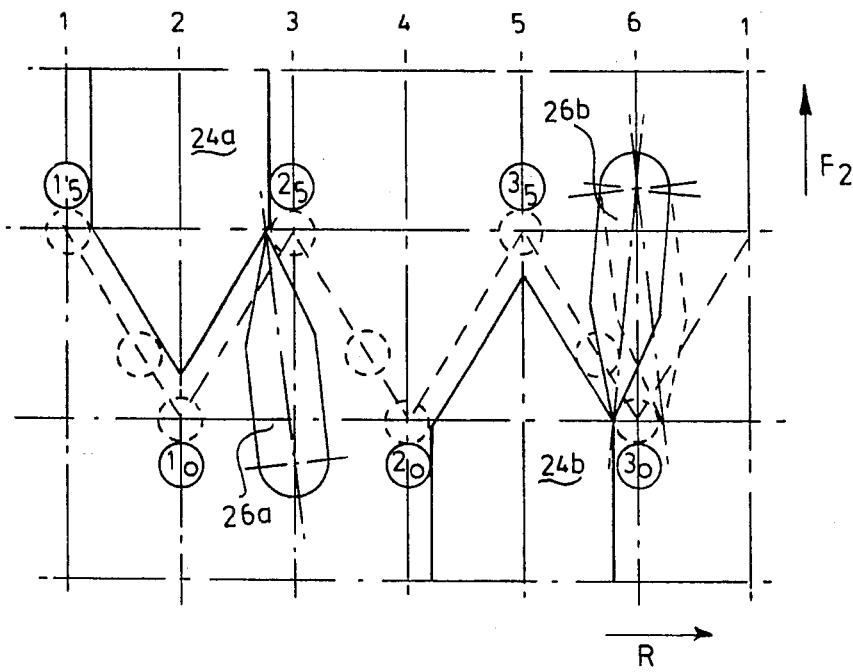

As shown in FIG. 3, pins 28 are initially in positions $1_0$, $2_0$ and $3_0$, i.e. the pin in position $1_0$ faces the point of cam 24a while the pins in positions $2_0$ and $3_0$ are in contact with the sides of the rectangular part of cam 24b. When shaft 22 is rectilinearly displaced in the direction indicated by arrow $F_1$, the pins in positions $2_0$ and $3_0$ glide along the opposite sides of the rectangular parts of cam 24b. During this displacement of the pins along the cam and until the pin in position $3_0$ comes into contact with the point of cam follower needle 26b, tubular shaft 10 remains immobile. As this pin reaches the needle point, it will be deflected by the side of the cam follower needle during its further displacement in a direction extending generally parallel to the side of the triangular cam part opposite the triangular cam part side engaged by the needle. This deflected displacement pushes the pin from position $3_0$ to position $3_1$ in the direction of arrow R, causing shaft 10 to turn in this direction. This rotation permits the passage of the point of cam 24a behind the pin 1. From this point on, cam 24a in engagement with the pin 1 controls the rotation of shaft 10 in the direction of arrow R. As this pin glides along the side of the cam from the point to the base of the triangular cam part, it finally reaches the point of needle 26a and displaces it against the bias of spring 34 a distance sufficient to permit passage of the pin. (For the sake of clarity, spring 34 has not been shown on the developed illustrations.)

Respective stop 35a, 35b limits the pivoting angle of the cam follower needle whereby the needle is displaced from the associated cam a distance just sufficient to permit passage of the pin between the cam and the cam follower needle. This stop may be constituted by a lug affixed to shaft 22 under the needle and engaging an oblong cavity defined in the needle.

From the beginning of the reciprocatory motion of shaft 22 until the moment when it has passed by cam 24b, needle 26a maintains the pin 1 in contact with cam 24a, and when this pin comes into contact with one side of the rectangular part of cam 24a, the pin 3 simultaneously comes into contact with the opposite side of this rectangular cam part. In this manner, a positive, bidirectional coupling between shafts 10 and 22 is assured in all relative positions of the pins and cams, including particularly the initial and end positions. This positive coupling permits the rotation of tubular shaft 10 in response to the rotation of tubular stub shaft 20 when the hydraulic jack malfunctions, assuming that tubular stub shaft 20 is so mounted on frame 18 as to make this rotation possible.

As sequential FIGS. 3 to 8 illustrate, the rectilinear movement of shaft 22 is alternately effected in opposite directions indicated by arrows $F_1$ and $F_2$, each movement in one direction causing a 60° rotation of tubular shaft 10 in six successive increments. After a full turn, the abutment pins return to their initial positions $1_0$, $2_0$ and $3_0$.

Figure 9:
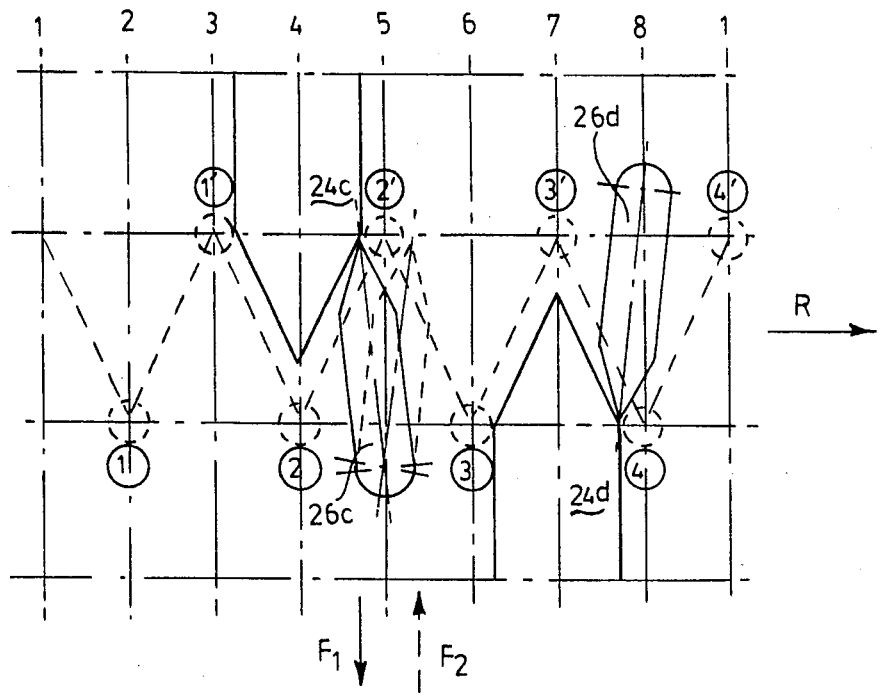
FIGS. 9 and 10 are like views showing two other embodiments of the invention.

FIG. 9 shows an embodiment of the mechanism for turning the tubular shaft in consecutive 45° steps. This mechanism comprises two cams 24c, 24d which are not diametrically opposite each other and four abutment pins in respective positions 1, 2, 3 and 4. The cooperation of the cams, cam follower needles 26c, 26d and the pins as they move from positions 1, 2, 3 and 4 to positions 1', 2', 3' and 4', etc., will be obvious from the preceding description.

Figure 10:
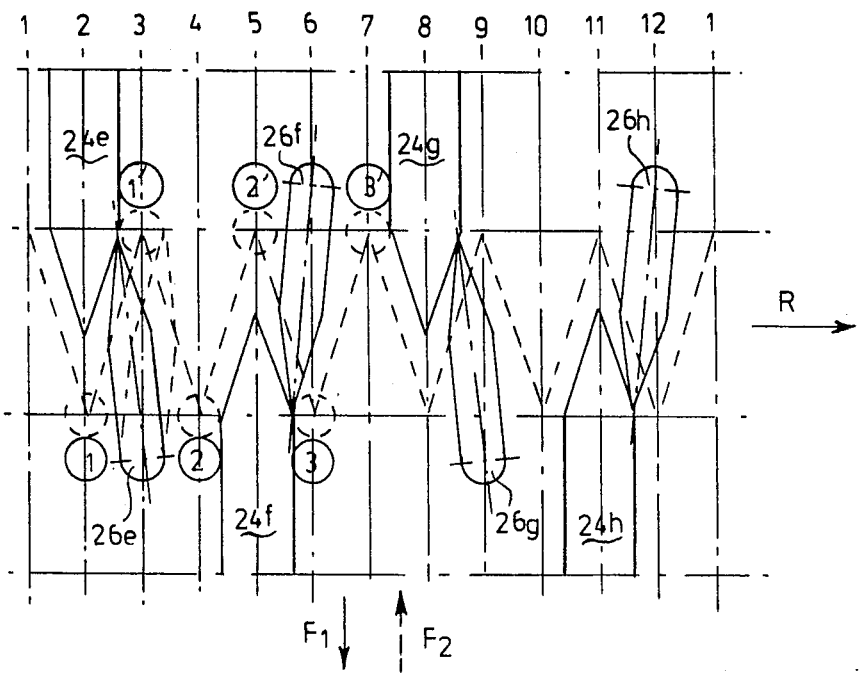

FIG. 10 shows an embodiment of the mechanism for turning the tubular shaft in consecutive 30° steps. It comprises four cams 24e, 24f, 24g and 24h regularly spaced about the periphery of shaft 22, and three abutment pins in positions 1, 2 and 3. The cooperation of the cams, cam follower needles 26e, 26f, 26g and 26h and the pins as they move from positions 1, 2 and 3 to positions 1', 2' and 3', etc., will be obvious from the preceding description.

To reduce friction, the abutment pins may be journaled in anti-friction bearings or they may be replaced by rollers. Any suitable means may be used for supporting and reciprocating shaft 22 and for supporting tubular shaft 10 for rotation about reciprocating shaft 22. Also, the mechanism of the present invention need not be disposed inside a tubular shaft. Furthermore, either the element carrying the cams or the element carrying the abutment pins may be driven for controlling the rotation of one of the elements in response to the rectilinear reciprocating motion of the other element.

What is claimed is:

1. A mechanism for transforming a reciprocating rectilinear motion into an intermittent rotary motion, which comprises
   (a) a first element having a longitudinal axis and being reciprocable in a direction parallel to said axis, the first element carrying
      (1) a set of at least two cams circumferentially and axially spaced from each other, each cam having, in plan view, the shape of a rectangular part having two opposite sides extending parallel to the axis and a triangular part having a base adjoining the rectangular part, the triangular part projecting from the rectangular part in the direction of the axis, and the triangular parts of the cams pointing in opposite directions,
   (b) a second element coaxially surrounding the first element and being rotatable about said axis, the second element carrying
      (1) a set of at least three pins having radially extending axes disposed in a plane extending perpendicularly to the longitudinal axis, the pins being circumferentially spaced from each other and projecting towards the cams for cooperation therewith to transform the reciprocating rectilinear motion of the first element into an intermittent rotary motion of the second element, the cams having a width and disposition and the pins having a circumferential spacing such that two adjacent ones of the pins simultaneously engage the opposite sides of the rectangular part of one cam and the third pin faces the point of the other cam, and
   (c) a cam follower needle associated with each cam, the needle resiliently engaging a side of the triangular cam part close to the base thereof to displace a respective one of the pins from the triangular cam part side when the pin glides along the rectangular cam part and reaches the triangular cam part base, and the needle being resiliently displaceable from the triangular cam part side to permit the passage of the pin gliding therealong from the point to the base of the triangular cam part.

2. The mechanism of claim 1, further comprising a radially extending pivot axis supporting the cam follower needle on the first element, the pivot axis being disposed remote from the rectangular cam part with respect to the point of the triangular cam part and the needle having a point disposed approximately at the level of the triangular cam part base, and a spring biasing the cam follower needle against the associated cam.

3. The mechanism of claim 2, further comprising a stop limiting the pivoting angle of the cam follower needle whereby the needle is displaced from the associated cam a distance just sufficient to permit passage of the pin.

* * * * *